United States Patent
Nabar et al.

(10) Patent No.: US 11,144,647 B2
(45) Date of Patent: Oct. 12, 2021

(54) SYSTEM AND METHOD FOR SECURE IMAGE LOAD BOOT FLOW USING HASHED METADATA

(71) Applicant: QUALCOMM INCORPORATED, San Diego, CA (US)

(72) Inventors: Anushka Mihir Nabar, Hyderabad (IN); Sudan Vilas Landge, Hyderabad (IN); Srinivasulu Reddy Beerelli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/790,166

(22) Filed: Feb. 13, 2020

(65) Prior Publication Data

US 2021/0064757 A1 Mar. 4, 2021

(30) Foreign Application Priority Data

Aug. 30, 2019 (IN) .............................. 201921034969

(51) Int. Cl.
*G06F 21/57* (2013.01)
*G06F 11/30* (2006.01)
*G06F 13/28* (2006.01)
*G06F 13/24* (2006.01)
*G06F 21/60* (2013.01)

(52) U.S. Cl.
CPC ........ *G06F 21/575* (2013.01); *G06F 11/3024* (2013.01); *G06F 13/24* (2013.01); *G06F 13/28* (2013.01); *G06F 21/572* (2013.01); *G06F 21/602* (2013.01)

(58) Field of Classification Search
CPC .... G06F 21/575; G06F 21/572; G06F 21/602; G06F 13/28; G06F 11/3024; G06F 9/445; G06F 9/4411; G06F 13/24
See application file for complete search history.

(56) References Cited

U.S. PATENT DOCUMENTS

| | | | | |
|---|---|---|---|---|
| 2002/0040415 A1* | 4/2002 | Moteki | ............... | G06F 13/28 710/260 |
| 2006/0036864 A1* | 2/2006 | Parulski | ............... | H04N 1/4486 713/176 |
| 2007/0162649 A1* | 7/2007 | Wang | ............... | G06F 13/34 710/22 |
| 2008/0147905 A1* | 6/2008 | Shi | ............... | G06F 13/32 710/22 |
| 2009/0242644 A1* | 10/2009 | Madej | ............... | G06K 7/10732 235/462.41 |
| 2013/0067245 A1* | 3/2013 | Horovitz | ............... | G06F 12/128 713/193 |
| 2020/0409721 A1* | 12/2020 | Gorecha | ............... | G06F 9/4403 |

* cited by examiner

*Primary Examiner* — Raymond N Phan
(74) *Attorney, Agent, or Firm* — Smith Tempel Blaha LLC/Qualcomm

(57) ABSTRACT

Various embodiments of methods and systems for a power and performance-optimized secure image load boot flow in a specialty metering device ("SMD") are disclosed. An exemplary method includes a CPU that transitions into an idle state, such as a WFI state, for durations of time during a boot sequence that coincide with processing by a DMA engine. That is, the CPU may "sleep" while the DMA engine processes workloads in response to instructions it received from the CPU.

30 Claims, 3 Drawing Sheets

SYSTEM AND METHOD FOR SECURE IMAGE LOAD BOOT FLOW USING HASHED METADATA

DESCRIPTION OF THE RELATED ART

Computing devices are ubiquitous in today's society. The Internet of Things, or "IoT" as it is often called, encompasses networked devices ranging from water and power meters, to gas pumps, to cell phones, to desktop computers, to home security systems, to domain name servers. The list of devices in our society that leverage Internet connectivity is almost too extensive to comprehensively list.

The personal computing device ("PCD") category of devices on the IoT, like cell phones, are in the "front and center" of our attention every day as they often require almost constant connectivity to deliver their expected functionality. We're constantly interacting with PCDs, it seems. We love our personal computing devices, but the IoT is primarily comprised of all those workhorse devices that quietly plug along doing their job without much of our attention. A great example of such a device might be a specialty metering device (an "SMD") in the form of a networked water meter on the side of a residential home, for example.

An SMD like a networked water meter may be battery powered and expected to only periodically connect to the Internet for upload of data to some remote server. Consequently, unlike in a PCD, a system on a chip ("SoC") in an SMD is only expected to "wake up" infrequently for the purpose of conducting some relatively small task like reading a meter value and reporting the value via a data connectivity link. When establishing the data connection, a SoC in an SMD may need to undergo multiple sleep and wakeup cycles in order to conserve battery power while it works to make the necessary Internet connection and upload the data.

Unlike in a PCD, a SoC in an SMD is expected to undergo relatively longer sleep durations than active durations. Moreover, relative to a PCD, the battery life for an SMD is expected to be much longer. Therefore, there is a need in the art for systems and methods that minimize the amounts of uptime experienced, and battery power consumed, by SoCs in SMDs. More specifically, there is a need in the art for a system and method that provides secure, parallel image loading by an SMD SoC during a cold boot mode, and/or exit mode from a low-power sleep state, while minimizing processing time and power consumption.

SUMMARY OF THE DISCLOSURE

Various embodiments of methods and systems for a power and performance-optimized secure image load boot flow in a specialty metering device ("SMD") are disclosed. An exemplary method includes a central processing unit ("CPU") initializing a direct memory access ("DMA") engine that is configured to read data from a memory component. The CPU then instructs the DMA engine to read metadata associated with an image in the memory component. The CPU also, for each given segment of the image, instructs the DMA engine to read chunks of the given data segment. The DMA engine provides the CPU with each chunk of the given segment upon completing a read of the previous chunk and before beginning a read of a next chunk. Upon receipt of each chunk of a given segment of the image, the CPU hashes metadata associated with the chunk and then transitions into an idle state for a duration of time that ends coincidentally with the DMA engine completing a read of a next chunk of the given segment. The CPU, upon receipt of a last chunk of a given segment of the image, hashes metadata associated with the last chunk and validates hash values for each of the chunks of the given segment of the image, thereby validating and authenticating the segment. The CPU repeats the above steps for each segment (hashing each chunk in parallel with the DMA engine loading a next chunk) until all segments of the image have been loaded, hashed and validated. With the entire image loaded, hashed and validated, the CPU may then complete the boot process by resetting a subsystem.

The DMA engine may be associated with a Flash controller for an external, non-volatile memory device (e.g., a Flash memory, EEPROM, MRAM, PRAM, FeRAM, CNRAM, etc.). The DMA engine is configured to read data from the memory component and provide it to the CPU that calculates a hash according to a predetermined hash function. The CPU instructs the DMA engine to read metadata and data segments, chunk by chunk, associated with the image. And, the CPU transitions into an idle state, such as a WFI state, for durations of time coinciding with processing by the DMA engine. That is, the CPU may "sleep" while the DMA engine processes workloads in response to instructions it received from the CPU. Advantageously, when the CPU is in the idle state it consumes less power than when in an active processing state and so embodiments of the solution realize power savings over prior art methods that keep the CPU in an active state throughout a boot process.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
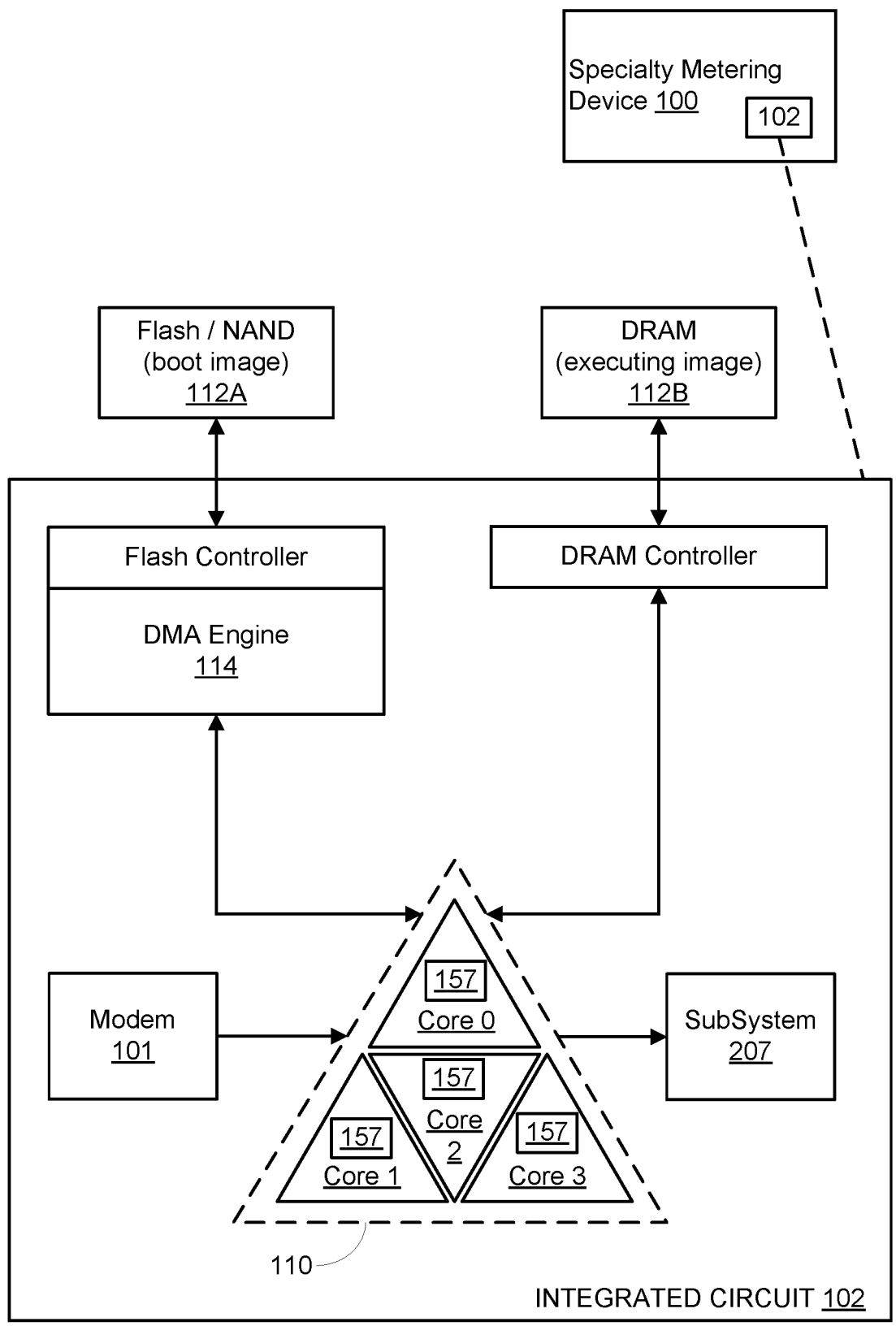
FIG. 1 is a functional block diagram illustrating an embodiment of an on-chip system for executing a power and performance-optimized secure image load boot flow according to the solution.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component," "processing engine," and the like are intended to refer to a computer-related entity, either hardware, firmware, a combination of hardware and software, software, or software in execution and represent exemplary means for providing the functionality and performing the certain steps in the processes or process flows described in this specification. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "application processor ("AP")," "chip" and "chipset" are non-limiting examples of processing components that may reside in a PCD and are used interchangeably except when otherwise indicated. Moreover, as distinguished in this description, a CPU, DSP, AP or a chip or chipset may be comprised of one or more distinct processing components generally referred to herein as "core(s)."

In this description, reference to "external memory device" and the like refers to a broader class of non-volatile (i.e., retains its data after power is removed) programmable memory and will not limit the scope of the solutions disclosed. As such, it will be understood that use of the terms envisions any programmable read-only memory or field programmable non-volatile memory suitable for a given application of a solution such as, but not limited to, embedded multimedia card ("eMMC") memory, electrically erasable programmable read-only memory ("EEPROM"), flash memory, etc.

In this description, the term "specialty metering device" ("SMD") is used to describe any device residing within the Internet of Things and operating on a limited capacity power supply (such as a battery). Examples of an SMD include, but are not limited to, a residential gas meter, a gasoline pump, a security monitoring camera, a wild game monitoring camera, etc.

In this description, the term "DMA engine" refers to a direct memory access component of the SoC in a SMD that allows certain hardware or subsystems, such as a modem for example, to access system and/or peripheral memory independently from the central processing unit ("CPU") or application processor.

In this description, the term "latency" is generally used to reference the time it takes for a given processing component to transition from a certain idle state to an active state for processing a workload, such as a boot sequence. Multiple idle states may be available for a given exemplary core and distinguished one from the other based on the latency and the leakage power of the core for each idle state. Generally speaking, the higher the latency associated with a certain idle state the lower the leakage rate (i.e., the lower the power consumption). Accordingly, as one of ordinary skill in the art will understand, an idle state associated with a high latency may afford better power savings as contrasted to an idle state associated with a high leakage rate which may afford relatively quicker response to a boot sequence workload. It is envisioned that in preferred embodiments of the solution, relatively high latency idle states may be leveraged in view of the realization that certain SMDs may not require low latency transitions to a processing state in order to achieve a desired quality of service ("QoS") level.

In this description, the terms "bootstrapping," "boot," "boot sequence," and the like are meant to refer to the set of operations that a CPU performs at the direction of an executing image when the CPU is powered on, or resumes from power saving modes, including, but not limited to, loading the operating system, subsequent images corresponding to different scenarios such as factory provision or normal boot up, and preparing the various SMD components for use. Terms such as "boot phase" and "boot stage" are meant to refer to a portion of an entire boot sequence which one of ordinary skill in the art understands to be collectively comprised of a series of temporally executed boot stages. A boot sequence may begin with a first-stage boot loader ("FSBL") stage followed by a second-stage boot loader ("SSBL") stage, a third-stage boot loader ("TSBL") stage and so on. Notably, exemplary embodiments of the solution are described within the context of responding to a CPU's effort to conduct a boot sequence and execute some action in response to an image retrieved from memory; however, it is envisioned that certain embodiments of the solutions may be applicable to CPU supervised boot sequences associated with other instruction and/or data sets stored in non-volatile memory.

For convenience of describing the exemplary embodiments of the solution, this description refers to a "wait for interrupt" ("WFI") idle state, although it is envisioned that certain embodiments of the solution may be configured to take advantage of other processor idle states such as, but not limited to, a retention idle state and/or a power collapse idle state. Even so, embodiments of the systems and methods are not limited to just the three idle states mentioned above or any particular combination of idle states. As one of ordinary skill in the art will understand, any number of idle states may be available and employed in an SMD, each such state offering varying latency levels and power savings levels.

SMDs commonly include a central processing unit ("CPU") that is comprised within a complex system termed a mobile chipset or system on a chip ("SoC"). The CPU is generally the overall supervisor of the functions delivered by the SoC and, as such, remains awake and consuming power during almost any activity of the SoC. For example, in systems and methods known in the art, when the SoC receives a memory page that requires some kind of processing attention, such as during the loading of an image, the CPU will take over processing of the memory page. At this point, the CPU is booted via its executing program and will remain in constant communication with the SRAM or DRAM (i.e., the memory component) until the page is processed.

The CPU, which may be a multi-core processing component, consumes significant amounts of power when it stays up and running at a relatively high frequency, such as when the CPU is supervising a boot flow and executing code from a "Secure Executable Elf Image" in RAM. As such, power savings in the SoC of an SMD may be realized if the CPU could be powered down, or otherwise given the opportunity to transition from an active processing state to an idle state (sometimes termed a "sleep state" or "sleep mode") that consumes less power. Similarly, further power savings may be realized when the power supplied to the DRAM associated with a CPU is lowered or removed. Systems and methods in the prior art have failed to find ways to exploit these areas of power savings during a boot sequence of an SMD.

By transitioning a memory component like DRAM and/or a core or cores of a CPU from an active processing state to an idle state during a boot sequence, thereby removing power from power rails and allowing content stored in the memory component(s) to be lost, embodiments of the solution advantageously enable power consumption associated with the active state of the CPU and/or memory component to be avoided. As will become clearer from a review of the figures and the associated detailed descriptions below, a CPU may be strategically transitioned in and out of a WFI state during a boot sequence by working in parallel with other SoC components, such as a DMA engine, to handle various steps of the boot sequence to bring a subsystem of the SoC out of reset. In doing so, the CPU and its associated memory component may require cold boot/authentication themselves multiple times during a boot sequence of a subsystem on the SoC in order to supervise certain actions in the boot sequence.

For embodiments of the solution, boot and authentication of the CPU and its associated memory occur frequently when its SMD is seeking connectivity to a communications network (e.g., the cellular network), yielding maximum power savings during supervisory of a boot sequence for a subsystem. The CPU may be booted/authenticated often throughout the boot sequence. After the CPU does its portion of the work in the boot sequence, it shuts down to the absolute lowest power state available (e.g., power rail removed, SRAM lost content, DRAM lost content), after which the only way to return the CPU to service for the subsystem boot sequence is by boot/authentication of the CPU and its memory.

When a processing core enters a WFI idle state, its processor clock is stopped, or "gated off," until an interrupt or debug event occurs (in this description, the interrupt event is referred to as a "wakeup interrupt" or "wakeup"). As such, according to embodiments of the present solution, the CPU core(s) is no longer in an active state for processing a boot sequence workload (thus saving power consumption) but remains ready to transition back to an active state in the event that an interrupt is detected. Even though the core is not consuming power for processing a workload when it is in the WFI idle state, voltage is likely still being supplied to the core and a measurable current inevitably remains on the power supply rail of the core in the form of a leakage current. Notably, the leakage current can be directly correlated with the temperature of the core (i.e., the junction temperature) and therefore one of ordinary skill in the art will recognize that measurement of the core's temperature can be used to calculate its ongoing rate of power consumption (regardless of the particular idle state in which the core may be).

Although exemplary embodiments of the solution are described within the context of transitioning a CPU in and out of a WFI state during a boot sequence, it is envisioned that some embodiments may leverage idle states other than the WFI idle state. For example, certain embodiments may transition a CPU in and out of a retention state during a boot sequence. The retention idle state is similar to the WFI idle state in that a processing core in the retention state has been clock gated. Further, though, when in the retention state the power voltage supplied to the processing core is also reduced. An advantage of the retention state over the WFI state is that less leakage current is associated with the retention state and, therefore, power savings in the retention state is improved over the WFI state. Notably, however, the latency time for the processor to return to an active state from the retention idle state is increased as compared to transitioning from the WFI state.

Yet another example of an idle state that may be leveraged by embodiments of the solution is a power collapse idle state. As compared to the retention idle state, a processing core that enters the power collapse idle state is fully clocked and all power is removed from its power supply rail. Consequently, the power savings associated with the power collapse idle state is improved over the WFI and retention states; however, the latency associated with the power collapse idle state is the longest in duration of all three exemplary states described herein because the core must go through a warm boot sequence in order to transition back to an active state.

Again, the general description of, and reference to, the above three idle states that may be available to an exemplary CPU in an SMD are offered for illustrative purposes only and are not meant to imply or suggest that embodiments of the systems and methods are only applicable to any one or more of these three idle states. It is envisioned that any number of idle states may be leveraged by embodiments of the systems and methods. Some idle states may clock gate a processor and/or reduce its power supply via software whereas other idle states may do so via hardware. Similarly, in addition to clock gating and reducing power to a processing component such as a CPU, some idle states may further turn off memory, drivers, bus hardware or the like. Memory components such as SRAM may enter a retention state, where the volatile contents in the memory array are retained, or may enter a partial power-down state where only a fraction of the array contents are retained or may enter a full power-down state where the entire array contents are lost and must be restored prior to use. Memory components such as DRAM may enter a retention state, where the volatile contents in the memory array are periodically refreshed, or may enter a partial power-down state where only a fraction of the array contents are refreshed, or may enter a full power-down state where the entire array contents are lost and must be restored prior to use. Generally, though, the more extreme the measures taken in a given idle state to conserve power, the longer it will take for a CPU, memory, drivers, bus hardware that is in that idle state to return to an active processing state.

Notably, it is envisioned that not all processing cores will exhibit equivalent power savings and latencies when operating at a given temperature and in a given idle state. As one of ordinary skill in the art will recognize, performance characteristics of various processing cores when in the same idle state and at the same operating temperature may differ for any number of reasons including, but not limited to, differing levels of silicon, design variations, etc. Moreover, one of ordinary skill in the art will recognize that the performance characteristics associated with any given processing core may vary in relation with the operating temperature of that processing core, the power supplied to that processing component according to the idle state, etc. And so, it is envisioned that embodiments of the solution may select and implement an idle state for a given CPU in view of its active junction temperature and latency characteristics.

For instance, consider an exemplary heterogeneous multi-core application processor which may include a number of different processing cores generally ranging in performance capacities from low to high (notably, one of ordinary skill in the art will recognize that an exemplary heterogeneous multi-processor system on a chip ("SoC") which may include a number of different processing components, each containing one or more cores, may also be considered). As would be understood by one of ordinary skill in the art, a low capacity to medium capacity processing core within the heterogeneous CPU will exhibit a lower power leakage rate in a given idle state, and consequently a lower rate of power consumption and thermal energy generation, than a processing core having a relatively high performance capacity and in the same idle state. For these reasons, one of ordinary skill in the art will recognize that, even though a high capacity core may be the most desirable for processing a given boot sequence for a page, a low capacity core may be more desirable in certain scenarios for designation to a WFI idle state as its lower leakage rate may not cause an overall power budget to be exceeded.

Embodiments of the solution realize power savings in a SoC by transitioning a CPU and/or its associated SRAM and/or DRAM memory to an idle state at various times and durations of a boot sequence. Transitioning a CPU and/or its SRAM and/or DRAM memory in and out of an idle processing state during a boot flow is unavailable in standard boot flows for SoCs of SMDs known in the art. For example, in prior art boot sequences on a typical SoC, when a modem receives a page from memory that requires some sort of workload processing or action, the modem will command the CPU to boot and take over processing of the page. The CPU remains up and running, often consuming copious amounts of power, from that point forward while sequentially loading and authenticating multiple images, one after the other.

An exemplary traditional boot flow for a hardware reset in this vein begins with a primary boot loader beginning execution of an image from ROM. The primary boot loader in ROM loads a secondary boot loader from storage (such as DRAM). The secondary boot loader takes over the boot process and, in turn, loads additional secure executable ELF images (images in an executable and linkable format) from storage into RAM and executes the images through the completion of the boot process. The CPU executes the secondary boot loader.

The secondary boot loader loading the ELF images entails first loading the ELF header and program header and hash segment. Next, asymmetric cryptography (RSA) may be used to authenticate the loaded data. A first segment of the image is then loaded from storage, hashed and validated before a next segment is loaded, hashed and validated. In this way, the secondary boot loader may sequentially load, hash and validate segments in an image until the full image loading is complete. The CPU is in an active processing state throughout execution of the various boot loaders.

As will become better understood from the following description and associated figures, embodiments of the solution provide for the CPU and/or the DRAM to be powered down into an idle state during strategic points in the novel boot sequence of an image from storage. In this way, embodiments of the solution may conserve power that would otherwise be consumed by a CPU core and DRAM executing a traditional boot flow.

Generally, embodiments of the solution load/read each segment of an image in chunks (or sectors) from the storage and hash them in parallel to the load of the next chunk. A storage DMA engine allows the loading from storage to be done without CPU intervention and the hash computation of the chunks may be done in parallel instead of wasting CPU cycles while waiting for a chunk load to complete. Whenever possible, embodiments of the solution may send the CPU into a sleep mode while enabling peripheral components to interrupt and wakeup the CPU when a chunk transfer is complete.

As understood by one of ordinary skill in the art, an image consists of multiple segments and a single metadata segment. Image loading involves loading the metadata first— the metadata contains the hash of each segment of the image (one entry per segment). As will become clearer from the figures and description that follows, embodiments of the solution leverage the structure of an image (a metadata segment plus a series of segments formed of chunks) to opportunistically transition a CPU in and out of a sleep state. More specifically, embodiments of the solution allow for the CPU to instruct the DMA to load a chunk/section of a first segment of an image and, while the DMA loads the chunk, the CPU hashes the previously loaded chunk/section using the hash from the previously loaded metadata. The CPU then sleeps until the DMA completes loading of the chunk. This pattern continues (the CPU instructing the DMA to load a next chunk while the CPU hashes the previously loaded chunk then sleeps) until the entire segment is read from the storage. At this point, the hash of the segment is compared with the metadata segment entry for that particular segment in order to validate the entire segment. If the hash is validated, the CPU may move to the next segment, load the next segment's metadata, and instruct the DMA engine to load the first chunk of the next segment. When the first chunk of the next segment is loaded, the CPU instructs the DMA engine to load the next chunk while the CPU hashes the previous chunk and then sleeps. The pattern continues, chunk by chunk with the CPU hashing a previously loaded chunk (and sleeping) while the DMA loads a next chunk until the entire segment is loaded and its hash validated. The process continues in this manner, segment by segment, until the entire image is loaded.

FIG. 1 is a functional block diagram illustrating an embodiment of an on-chip system 102 for executing a power and performance-optimized secure image load boot flow in an SMD 100 according to the solution. As can be seen in the FIG. 1 illustration, a modem 101 is in communication with a multi-core CPU 110. The CPU 110 may be operable to communicate with a subsystem 207 in need of reset, i.e., the CPU 110 may be operable to execute a boot sequence for the subsystem 207. A non-limiting example of a subsystem 207 may be a camera or a meter.

The CPU 110 is also in communication with a flash controller and its associated DMA engine 114. The flash controller controls and manages access to data images stored in external memory, such as Flash/NAND memory 112A. Further, the CPU 110 may also be in communication with a DRAM memory 112B, by and through a DRAM controller, as would be understood by one of ordinary skill in the art. As will become better understood from subsequent figures and their related description, the SoC 102 system illustrated in FIG. 1 may be configured and operable to executed a boot sequence for subsystem 207 using an embodiment of the solution that allows for the CPU 110 to transition in and out of an idle state, such as a WF1 state, as needed.

Figure 2:
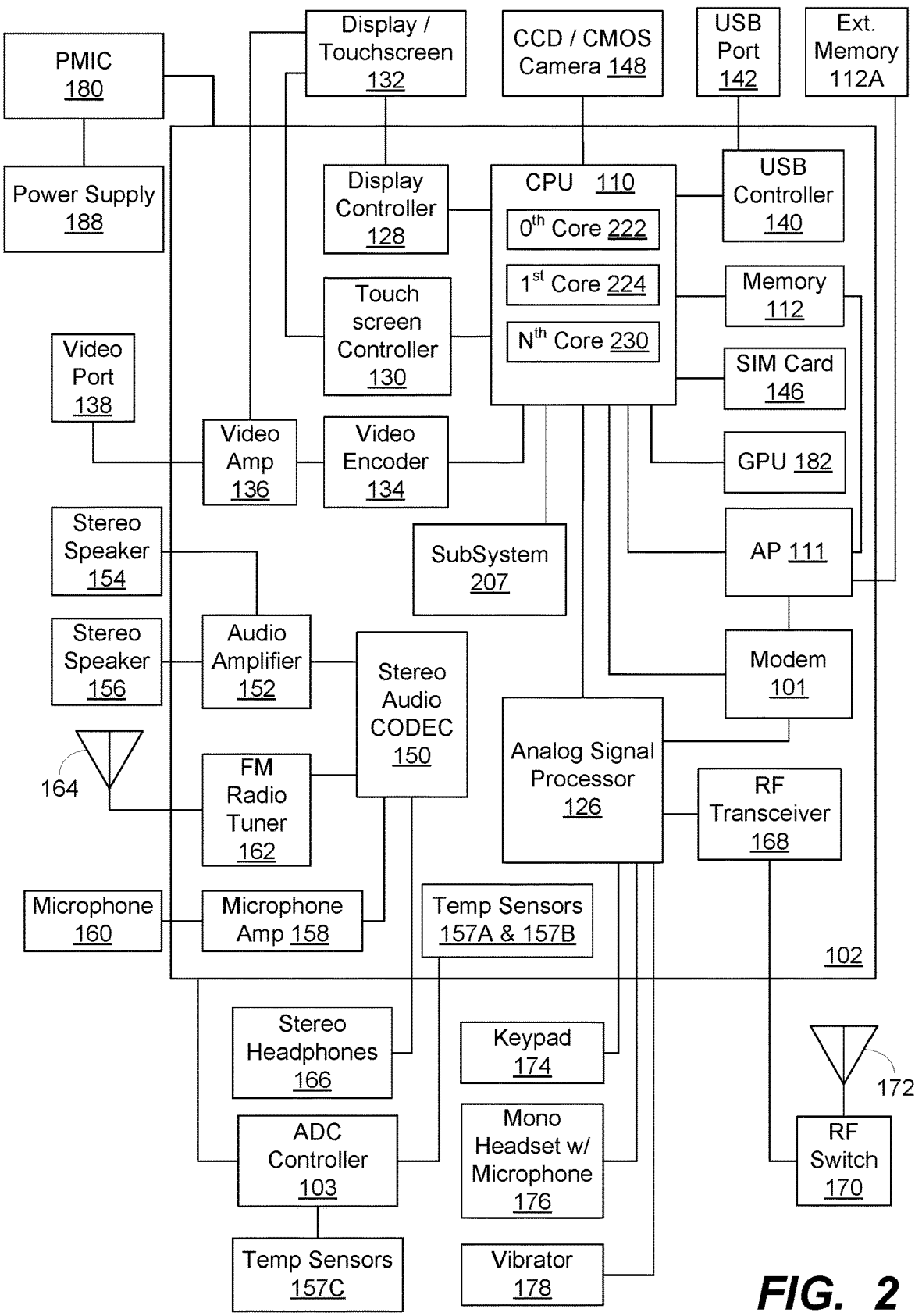
FIG. 2 is a functional block diagram of an exemplary, non-limiting aspect of an SMD for implementing methods and systems for a power and performance-optimized secure image load boot flow.

Turning now to FIG. 2, illustrated is a functional block diagram of an exemplary, non-limiting aspect of an SMD 100 for implementing methods and systems for a power and performance-optimized secure image load boot flow according to the solution. As shown, the SMD 100 includes an on-chip system 102 that includes a heterogeneous, multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") or application processor ("AP") 111 may also be employed as understood by one of ordinary skill in the art. Moreover, as is understood in the art of heterogeneous multi-core processors, each of the cores 222, 224, 230 may process workloads at different maximum voltage frequencies, exhibit different IDDq leakage rates at given temperatures and operating states, have different latencies for transitioning from a given idle operating state to an active state, etc.

In general, the modem 101 may be responsible for monitoring page requests requiring action and directing the CPU 110, which also may be a heterogeneous multi-core processor, to initiate a boot sequence during which it transitions in and out of a WFI state in order to conserve energy consumption. In some embodiments, the CPU 110 may receive temperature data from a monitor module (not depicted in the FIG. 2 illustration), as well as other condition indicators, and use the data to determine the impact on latencies and power consumption that may result from transitioning one or more of its cores to a different operating state during the boot sequence.

The CPU 110 may communicate with multiple operational sensors (e.g., thermal sensors 157) and components distributed throughout the on-chip system 102 of the SMD 100.

As illustrated in FIG. 2, a display controller 128 and a touch screen controller 130 are coupled to the CPU 110. A touch screen display 132 external to the on-chip system 102 is coupled to the display controller 128 and the touch screen controller 130. SMD 100 may further include a video decoder 134, e.g., a phase-alternating line ("PAL") decoder, a sequential couleur avec memoire ("SECAM") decoder, a national television system(s) committee ("NTSC") decoder or any other type of video decoder 134. The video decoder 134 is coupled to the multi-core CPU 110. A video amplifier 136 is coupled to the video decoder 134 and the touch screen display 132. A video port 138 is coupled to the video amplifier 136. As depicted in FIG. 2, a universal serial bus ("USB") controller 140 is coupled to the CPU 110. Also, a USB port 142 is coupled to the USB controller 140. A memory 112 (on-chip DRAM 112B and off-chip Flash 112A) and a subscriber identity module ("SIM") card 146 may also be coupled to the CPU 110 and/or AP 111. Further, as shown in FIG. 2, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 2, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 2 shows that a microphone amplifier 158 may be also coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 2 further indicates that a radio frequency ("RF") transceiver 168 may be coupled to the analog signal processor 126. An RF switch 170 may be coupled to the RF transceiver 168 and an RF antenna 172. As shown in FIG. 2, a keypad 174 may be coupled to the analog signal processor 126. Also, a mono headset with a microphone 176 may be coupled to the analog signal processor 126. Further, a vibrator device 178 may be coupled to the analog signal processor 126. FIG. 2 also shows that a power supply 188, for example a battery, is coupled to the on-chip system 102 via a power management integrated circuit ("PMIC") 180. In a particular aspect, the power supply 188 includes a rechargeable DC battery or a DC power supply that is derived from an alternating current ("AC") to DC transformer that is connected to an AC power source.

The CPU 110 may also be coupled to one or more internal, on-chip thermal sensors 157A and 157B as well as one or more external, off-chip thermal sensors 157C. The on-chip thermal sensors 157A, 157B may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157 may produce a voltage drop that is converted to digital signals with an analog-to-digital converter ("ADC") controller (not shown). However, other types of thermal sensors 157 may be employed without departing from the scope of the SMD 100.

The thermal sensors 157, in addition to being controlled and monitored by an ADC controller, may also be controlled and monitored by one or more modem 101 and/or monitor module(s). The modem 101 and/or monitor module(s) may comprise software which is executed by the CPU 110. However, the modem 101 and/or monitor module(s) may also be formed from hardware and/or firmware without departing from the scope of the invention.

Returning to FIG. 2, the touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, thermal sensors 157C, PMIC 180, Flash 112A and the power supply 188 are external to the on-chip system 102. However, it should be understood that the modem 101 and CPU 110 may also receive one or more indications or signals from one or more of these external devices by way of the analog signal processor 126 and the CPU 110 to aid in the real time management of the resources operable on the SMD 100.

In a particular aspect, one or more of the method steps described herein may be implemented by executable instructions and parameters stored in the memory 112. The processors 110, 111, 126, the modem 101, and the DMA engine 114 (not shown in FIG. 2), the memory controllers and associated memory 112, the instructions stored therein, or a combination thereof may serve as a means for performing one or more of the method steps described herein.

Figure 3:
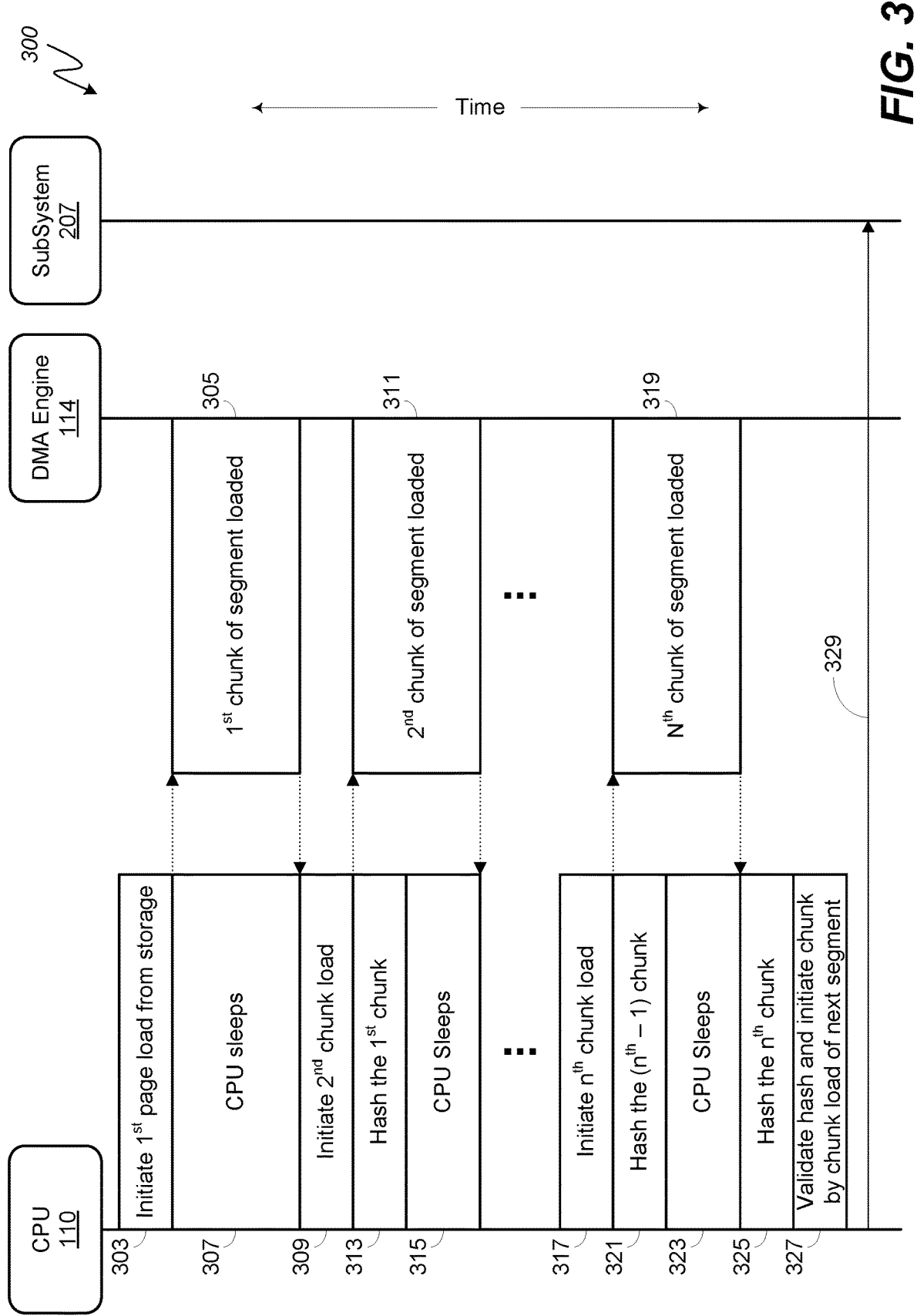
FIG. 3 is a sequence diagram illustrating an exemplary embodiment of a method for a power and performance-optimized secure image load boot flow according to the solution.

FIG. 3 is a sequence diagram illustrating an exemplary embodiment of a method 300 for a power and performance-optimized secure image load boot flow in an SMD according to the solution. The method 300 begins with CPU 110 in an active processing state and DMA Engine 114 initialized. The CPU 110 may be seeking to execute ELF images from storage in an effort to bring subsystem 207 out of a reset. An example of such a scenario within the context of an SMD 100 may be a gas metering device that is scheduled to connect to a communication network (such as a cellular data network) for upload of collected metered data.

Beginning at action 303, the CPU 110 may initiate a first page load from storage and trigger DMA engine 114 to read metadata associated with a first segment of the particular image. In response, the DMA engine 114 may take action 305 to read the metadata and commence loading the first chunk of the segment. The DMA engine 114 (or some other component of the SoC 102) may also return a non-blocking acknowledgement to CPU 110. Advantageously, the CPU 110 (and its associated memory component, DRAM and/or SRAM for example) may enter a first WFI state 307 to conserve power consumption as the DMA engine 114 reads the metadata and loads the first chunk during action 305. The CPU 110 may remain in the first WFI state 307 until at the end of action 305 it receives a wakeup interrupt. Notably, reference in this description to the CPU 110 entering and/or remaining in a WFI state, or any retention or power collapse state, will be understood to mean that not only the CPU 110 is in the WFI state but also, in some embodiments, any memory component associated with the CPU 110. Removing power from the rails used to supply power to the CPU 110 and/or its associated memory component 112 will advantageously conserve power consumption on the SoC 102.

In response to the wakeup interrupt at the end of action 305, the CPU 110 may transition out of the WFI state and back to an active processing state to take action 309 and initiate the read of a next, or second, chunk of the segment of the image from storage. The DMA engine 114 may then proceed with action 311 to load the next, or second, chunk of the segment from storage while the CPU 110 simultaneously proceeds with action 313 to calculate a hash associated with the now-loaded first chunk. Advantageously, with the first chunk of the segment hashed, the CPU 110 may enter a second WFI state 315 to conserve power consumption as the DMA engine 114 continues to work to read the next chunk of the segment per action 311. The CPU 110 may remain in the WFI state 315 until it receives a wakeup interrupt at the DMA engine's 114 completion of action 311.

This procedure of the CPU 110 initiating a next chunk load then hashing a previously loaded chunk before entering a sleep state while the DMA engine 114 completes the load of the next chunk may continue until an "$n^{th}$" and final chunk of the segment is loaded by the DMA engine 114. That is, referring to the FIG. 3 illustration, the method 300 may repeat with actions 317-327 until all chunks of a section of the image are loaded. At action 317 the CPU 110 initiates the load of the n chunk of the section and at action 319 the DMA engine 114 proceeds to load the $n^{th}$ chunk. While the DMA engine 114 is loading the $n^{th}$ chunk, the CPU 110 at actions 321 and 323 may hash the previously loaded chunk (i.e., chunk $n^{th}-1$) and then enter a sleep state while the DMA engine 114 completes action 319. With action 319 complete, the DMA engine 114 (or some other component of SoC 102) may send a wakeup signal to CPU 110, thereby bringing CPU 110 back into an active processing state so that it can take actions 325 and 327 to hash the n chunk and validate the hash of the entire segment. With the segment fully loaded, hashed and validated, the CPU 110 may repeat steps 303-327 for each additional segment of the image. Once all segments of the image have been loaded, hashed and validated on a chunk by chunk basis according to the process 300 described above, the CPU 110 may take action 329 to bring subsystem 207 out of reset. Advantageously, throughout the boot sequence 300, the CPU 110 periodically transitioned in and out of a WFI idle state, thereby avoiding unnecessary power consumption while the DMA engine 114 processed workloads.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for secure image load boot flow, the method comprising:
   a. a central processing unit ("CPU") initializing a direct memory access ("DMA") engine, wherein the DMA engine is configured to read data from memory;
   b. the CPU instructing the DMA engine to read metadata associated with an image in the memory;
   c. the CPU, for one given data segment of the image, instructing the DMA engine to read chunks of the given data segment, wherein the DMA engine provides the CPU with each chunk of the given data segment upon completing a read of the previous chunk and before beginning a read of a next chunk;
   d. the CPU, upon receipt of each chunk of a given data segment of the image, hashing metadata associated with the chunk and transitioning into an idle state for a duration of time that ends with the DMA engine completing a read of a next chunk of the given data segment;
   e. the CPU, upon receipt of a last chunk of a given data segment of the image, hashing metadata associated with the last chunk and validating hash values for each of the chunks of the given data segment of the image;
   f. the CPU repeating steps c through e until all data segments of the image have been loaded, hashed and validated; and
   g. the CPU resetting a subsystem.

2. The method of claim 1, wherein the memory component is a non-volatile Flash memory component.

3. The method of claim 1, wherein the CPU is a heterogeneous, multi-core processor.

4. The method of claim 1, wherein the idle state is a wait-for-interrupt ("WFI") idle state.

5. The method of claim 1, wherein the SMD comprises at least one of a residential gas meter, a gasoline pump, and a security monitoring camera.

6. A method for secure image load boot flow, the method comprising:
   a. initializing a direct memory access ("DMA") engine, wherein the DMA engine is configured to read data from memory;
   b. instructing the DMA engine to read metadata associated with a first segment of an image stored in the memory and a first chunk of the first segment;
   c. transitioning a central processing unit ("CPU") from an active processing state into an idle state, wherein when the CPU is in the idle state it consumes less power than when in the active processing state;
   d. holding the CPU in the idle state for a duration of time;
   e. transitioning the CPU from the idle state to the active processing state;
   f. receiving from the DMA engine the metadata associated with the first segment and the first chunk of the first segment;
   g. instructing the DMA engine to read a next chunk of the first segment;
   h. calculating a hash value for the first chunk of the first segment; and
   i. transitioning the CPU from the active processing state to the idle state.

7. The method of claim 6, further comprising:
   j. holding the CPU in the idle state for a next duration of time.

8. The method of claim 6, wherein the SMD comprises at least one of a residential gas meter, a gasoline pump, and a security monitoring camera.

9. The method of claim 7, further comprising:
   k. transitioning the CPU from the idle state to the active processing state.

10. The method of claim 9, further comprising:
    l. receiving the next chunk of the first segment from the DMA engine.

11. The method of claim 10, further comprising:
    m. instructing the DMA engine to read a next chunk of the first segment of the image; and
    n. calculating a hash value for the next chunk of the first segment.

12. The method of claim 11, further comprising:
    o. repeating actions i through n until a last chunk of the first segment of the image is received from the DMA engine and hashed.

13. The method of claim 12, further comprising:
    p. authenticating the hash of the first segment of the image by validating the hash values and signatures associated with the chunks.

14. The method of claim 13, further comprising repeating steps b through p for each segment of the image until all segments of the image are loaded, hashed and validated; and bringing a subsystem out of reset.

15. A computer system for secure image load boot flow, the system comprising:
   a central processing unit ("CPU") configured to:
      a. initialize a direct memory access ("DMA") engine, wherein the DMA engine is configured to read data from memory;
      b. instruct the DMA engine to read metadata associated with an image in the memory;
      c. instruct, for one given data segment of the image, the DMA engine to read chunks of the given data segment, wherein the DMA engine provides the CPU with each chunk of the given data segment upon completing a read of the previous chunk and before beginning a read of a next chunk; and
      d. hash, upon receipt of each chunk of a given data segment of the image, metadata associated with the chunk and transitioning into an idle state for a duration of time that ends coincidentally with the DMA engine completing a read of a next chunk of the given data segment.

16. The system of claim 15, wherein the central processing unit ("CPU") is configured to:
   e. hash, upon receipt of a last chunk of a given data segment of the image, metadata associated with the last chunk and validating hash values for each of the chunks of the given data segment of the image.

17. The system of claim 15, wherein the memory component is a non-volatile Flash memory component.

18. The system of claim 15, wherein the CPU is a heterogeneous, multi-core processor.

19. The system of claim 15, wherein the idle state is a wait-for-interrupt ("WFI") idle state.

20. The system of claim 15, wherein the SMD comprises at least one of a residential gas meter, a gasoline pump, and a security monitoring camera.

21. The system of claim 16, wherein the central processing unit ("CPU") is configured to:
   f. repeating steps c through e until all data segments of the image have been loaded, hashed and validated; and
   g. reset a subsystem.

22. A computer system for secure image load boot flow, the system comprising:

a. means for initializing a direct memory access ("DMA") engine, wherein the DMA engine is configured to read data from memory;
b. means for instructing the DMA engine to read metadata associated with an image in the memory;
c. means for, for one given data segment of the image, instructing the DMA engine to read chunks of the given data segment, wherein the DMA engine provides the CPU with each chunk of the given data segment upon completing a read of the previous chunk and before beginning a read of a next chunk; and
d. means for, upon receipt of each chunk of a given data segment of the image, hashing metadata associated with the chunk and transitioning into an idle state for a duration of time that ends coincidentally with the DMA engine completing a read of a next chunk of the given data segment.

23. The computer system of claim 22, further comprising:
e. means for, upon receipt of a last chunk of a given data segment of the image, hashing metadata associated with the last chunk and validating hash values for each of the chunks of the given data segment of the image.

24. The computer system of claim 22, wherein the memory component is a non-volatile memory component.

25. The computer system of claim 22, wherein the CPU is a heterogeneous, multi-core processor.

26. The computer system of claim 22, wherein the idle state is a wait-for-interrupt ("WFI") idle state.

27. The computer system of claim 22, wherein the SMD comprises at least one of a residential gas meter, a gasoline pump, and a security monitoring camera.

28. The computer system of claim 23, further comprising:
f. means for causing means c through e to repeat their functions until all data segments of the image have been loaded, hashed and validated.

29. The computer system of claim 24, wherein the non-volatile memory component comprises flash memory.

30. The computer system of claim 28, further comprising:
g. means for resetting a subsystem.

* * * * *